United States Patent [19]

Quermann

[11] Patent Number: 4,503,718
[45] Date of Patent: Mar. 12, 1985

[54] AZIMUTH DETERMINING GYROSCOPE

[75] Inventor: Thomas R. Quermann, Huntington Station, N.Y.

[73] Assignee: Sperry Corporation, New York, N.Y.

[21] Appl. No.: 365,052

[22] Filed: Apr. 2, 1982

[51] Int. Cl.³ .............................................. F16D 19/30
[52] U.S. Cl. ........................................ 74/5.46; 74/5.5; 74/5.6 E; 74/5.8
[58] Field of Search ............... 74/5.46, 5.5, 5.6 E, 74/5.8, 5.41

[56] References Cited

U.S. PATENT DOCUMENTS

| | | | |
|---|---|---|---|
| 1,141,099 | 6/1915 | Anschutz-Kaempfe | 74/5.8 |
| 2,690,014 | 9/1954 | Draper et al. | 74/5.5 X |
| 2,899,828 | 8/1959 | Lynn | 74/5.5 |
| 3,172,213 | 3/1965 | Eklund | 74/5.5 X |
| 3,512,264 | 5/1970 | Ambrosini | 74/5.6 E X |
| 4,283,960 | 8/1981 | Quermann | 74/5.41 |
| 4,383,452 | 5/1983 | Imbeninato et al. | 74/5.41 X |

FOREIGN PATENT DOCUMENTS 173962  2/1966  U.S.S.R. ............................... 74/5.46

Primary Examiner—Rodney H. Bonck
Attorney, Agent, or Firm—Howard P. Terry

[57] ABSTRACT

In an azimuth determining gyroscope, a mechanically balanced gimbal is suspended from a fixed case by a wire which passes through the generally tubular upper portion of the suspended gimbal. A spin motor and a wheel for rotating about a vertical axis are coupled to the lower portion of the suspended gimbal. The upper portion of the suspended gimbal has pickoff and torquer coils for measuring the position of the suspended gimbal with respect to the fixed case and for providing torque to the suspended gimbal. Leads to the spin motor are configured to act as azimuth restraint means between the suspended gimbal and the fixed case.

9 Claims, 10 Drawing Figures

AZIMUTH DETERMINING GYROSCOPE

BACKGROUND OF THE INVENTION

1. Field of the Invention

This invention relates to gyroscopes, and more specifically to a portable azimuth determining gyroscope suitable for use with weapon systems and survey equipment.

2. Description of the Prior Art

The problem of establishing the azimuth orientation of a stationary device quickly and accurately with respect to true north has received considerable attention recently. Modern military tactics require high mobility and quick reaction capability. It is necessary to determine the azimuth alignment of weapons and radar equipment quickly and accurately as soon as they are emplaced. Moreover, an accurate self contained azimuth reference is of great utility to surveyors since it permits them to operate under overcast conditions when celestial references are not available.

The conventional gyrocompass used on ships is of little use in this type of application because its settling time is much too long. Attempts to shorten this time have been partially successful, but the very short reaction times required have necessitated a different approach. Instead of configuring the gyro so that the combined effects of gravity and earth rotation precess the spin axis to lie in the meridian plane, the gyro is designed to measure two orthogonal horizontal components of earth rotation rate. The azimuth orientation of the instrument is then determined by calculating the arc tangent of the quotient of these two components.

Two basic approaches to the mechanization of this form of azimuth reference have been produced. The first approach, as generally described in U.S. Pat. No. 4,283,960 issued to Thomas R. Quermann on Aug. 18, 1981 and assigned to the Applicant's assignee, uses a gyro with a horizontal spin axis pendulously restrained about one axis and restrained in azimuth by a conventional torque feedback loop. The current in the restraining torquer is the measure of the horizontal component of earth rate perpendicular to the spin axis. To measure the required two components, this gyro assembly must be repositioned 90 degrees between measurements. The second approach uses a two degree of freedom dynamically tuned free rotor gyro mounted with its spin axis vertical. When operated in a torque feedback mode the two torquing currents are the measures of the two horizontal components of earth rate. However, in order to separate spurious gyro bias torquers from the desired rate measurements it is necessary to rotate this gyro assembly 180° and repeat the measurement. The bias can be eliminated in the first implementation by reversing the direction of spin of the wheel in each azimuth position and subtracting the measurement with the wheel reversed from that with normal rotation. Wheel reversal is not effective in the second implementation because the bias is a function of wheel rotation.

It is evident that both implementations require a precision indexing mechanism to rotate the gyro assembly through a predetermined angle (90° or 180°). The additional bearings, gears, drive motor, stops etc. add considerably to the size, weight, complexity, and cost of the instrument and have a detrimental effect on its reliability.

Another requirement of these instruments is that they find azimuth accurately when the instrument is not perfectly leveled. This requires that the gyro be positioned internally so that the sensitive axis (axes) remain in a horizontal plane. In the second implementation this is accomplished by mounting the complete dynamically tuned gyroscope with its pickoffs and torquers on a pendulous assembly which can tilt with respect to the fixed case. Since all electrical leads required to operate the gyro must now cross an articulated joint without imposing excessive restraint, a significant increase in complexity and reduction in reliability must result.

It is obvious that the first implementation is inherently slower than the second since four sequential measurements must be made instead of two as is the case for the second. Accordingly, there is a need for an azimuth determining gyroscope which has the inherent speed of the second implementation described above, while drastically simplifying its construction by eliminating the need for an indexing drive.

SUMMARY OF THE INVENTION

The apparatus of the present invention provides a simple and fast azimuth determining gyroscope suitable for use with weapon systems and survey equipment. The apparatus includes a vertical spin axis wheel mounted in a gimbal which is neutrally balanced about the lower end of a suspension wire attached to the case of the apparatus. The apparatus further includes a two axis horizontal translational pickoff and torquer assembly disposed partially on the suspended gimbal, partially on the case, and centered about the upper end of the suspension wire. Moreover, the spin motor is provided with flex leads for carrying power which restrain the gimbal from movement about the vertical axis while offering minimal restraint to small displacements about the horizontal axes.

The apparatus of the present invention completely eliminates the need for an indexing drive. It combines the pendulous suspension with the sensitive axis suspension, and places all wound components of the pickoffs and torquers on the fixed case so that only the spin motor supply circuits must cross the articulated joint. Gyro bias is canceled by making measurements with forward and reversed wheel spin.

DESCRIPTION OF THE PREFERRED EMBODIMENT

Figure 1:
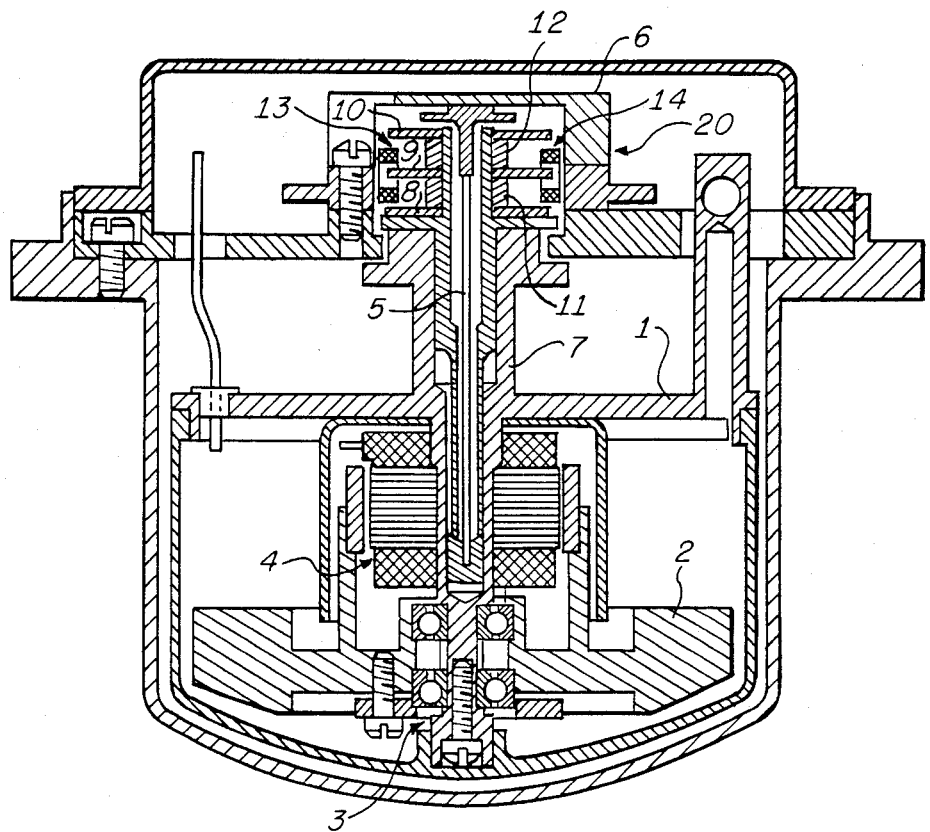
FIG. 1 is an elevational view in cross section of the present invention.

Referring now to FIG. 1, an elevational view in cross section of the apparatus of the present invention is provided. The apparatus includes a gimbal 1 containing a wheel 2 mounted on bearings 3 driven by a motor 4. The gimbal 1 is suspended by a wire 5 attached to a fixed case 6. The upper end of the gimbal 1 consists of tubular member 7 which supports a magnetic assembly 20 having three cruciform iron plates 8, 9, and 10 separated by permanent magnet rings 11, 12.

Figure 3:
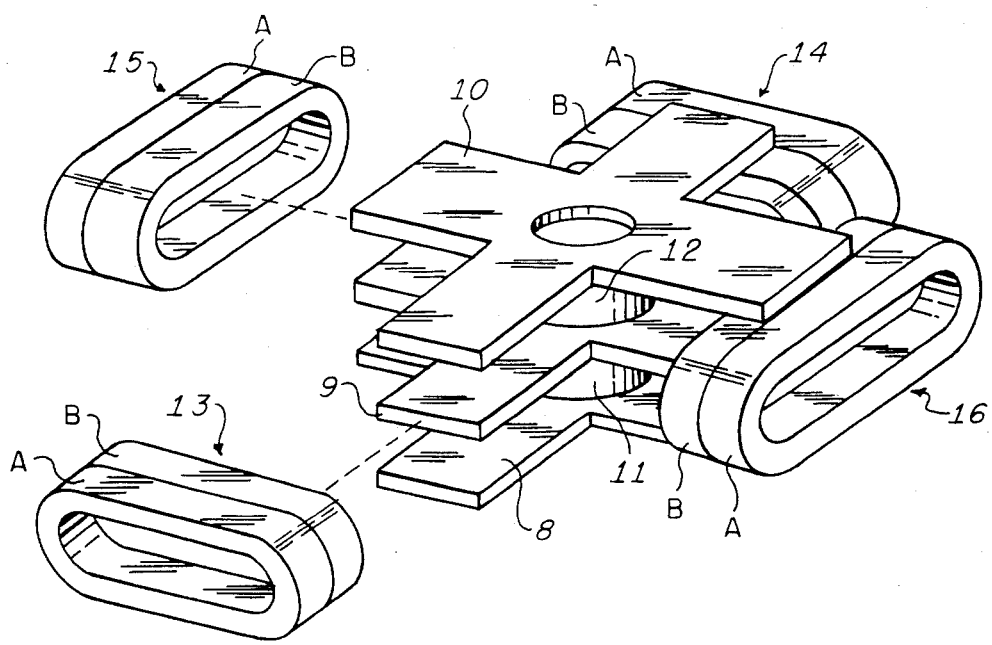
FIG. 3 is an enlarged illustration of the pickoff and torquer assembly of FIG. 1.

Referring now to FIG. 3, wherein the magnetic assembly 20 or assembly is illustrated in greater detail. The pickoff and torquer assembly 20 includes elongated coil assemblies 13, 14, 15, 16 displaced at 90° angles and cooperating with the four projecting legs of the central iron plate 9. Each coil assembly 13, 14, 15, 16 consists of two adjacent coils A, B. The inner coil B of coil assembly 16, for example, is inserted fully into the airgap while the outer coil A is not fully inserted. The outer coils A are the torquer coils and produce a lateral force on the upper end of the gimbal 1 when excited with d.c. current. The inner coils B are the pickoff coils. Opposite pairs of pickoff coils 13B, 14B and 15B, 16B form the active elements in inductance bridges and provide a measure of the lateral position of the upper end of the gimbal 1 with respect to the fixed case 6.

The key to understanding the operation of this device is the recognition that the long slender suspension wire 5 behaves essentially like a rigid bar with a hinge at each end. If the gimbal 1 is mechanically balanced so that its center of gravity is just slightly above the point of attachment to the suspension wire 5, the gimbal 1 can be made to achieve essentially neutral balance wherein no external torque is required to hold it in any vertical or tilted position. If the pickoff and torquers of assembly 20 are connected in closed loops which maintain the pickoffs at null, negligible current will be required in the torquers when the wheel is static. It should be noted that since the pickoff torquer assembly 20 is centered with respect to the upper end of the suspension wire 5, tilting of the case 6 has negligible effect on the pickoff torquer loops.

When the gyro wheel 2 is spinning, however, torque must be applied to the gimbal 1 to precess the wheel 2 to follow the rotation of the earth. This torque is produced by the lateral force of the torquers of assembly 20 together with a minute displacement of the suspended gimbal. The two orthogonally positioned coil pairs 13, 14 and 15, 16 measure the required two components of earth rate. By reversing the direction of rotation of wheel 2 and noting the resulting change in torque requirement, the measurement is made independent of any fixed gimbal unbalance or bias torque. It should be noted that the wheel reversal is accomplished with the same bearings 3 and motor 4 that are required to suspend and drive the wheel 2 in one direction. Thus, no additional structure is required for bias cancellation. It should be further noted that by eliminating the need for an indexing drive, any errors associated with imperfections in the repeatability of the drive are eliminated.

The detailed operation of the apparatus of the present invention can be described with reference to FIG. 2 which shows a schematic of the gyro elements and a block diagram of the electronic elements needed for its operation. The electronics are considered to be only representative of a control system used in conjunction with the apparatus of the present invention and are shown only as an aid in understanding the operation of the invention. More sophisticated control systems for completely automatic operation and reduction of electronic errors can be devised by those skilled in the electronics art.

The apparatus of the present invention is operated in a closed loop manner wherein the pickoff outputs are driven to null by the application of the proper torquer currents. However, the loops recommended for this gyro and shown in FIG. 2 are unusual in that the axes are closed on themselves. That is, the signal used to drive each torquer is derived from the pickoff on the same axis as the torquer. Since a torque applied about an axis of a gyro causes precession about an axis 90° displaced from the torquing axis, the arrangement shown appears to be incorrect. It is not. It is intentionally configured as shown to eliminate major errors which could occur with the more conventional arrangement. These errors arise from the reversal of phasing required to maintain stability of the conventional loops when the wheel is reversed. Such switching can cause rectification of bias due to standoff and lead to large errors.

Figure 2A:
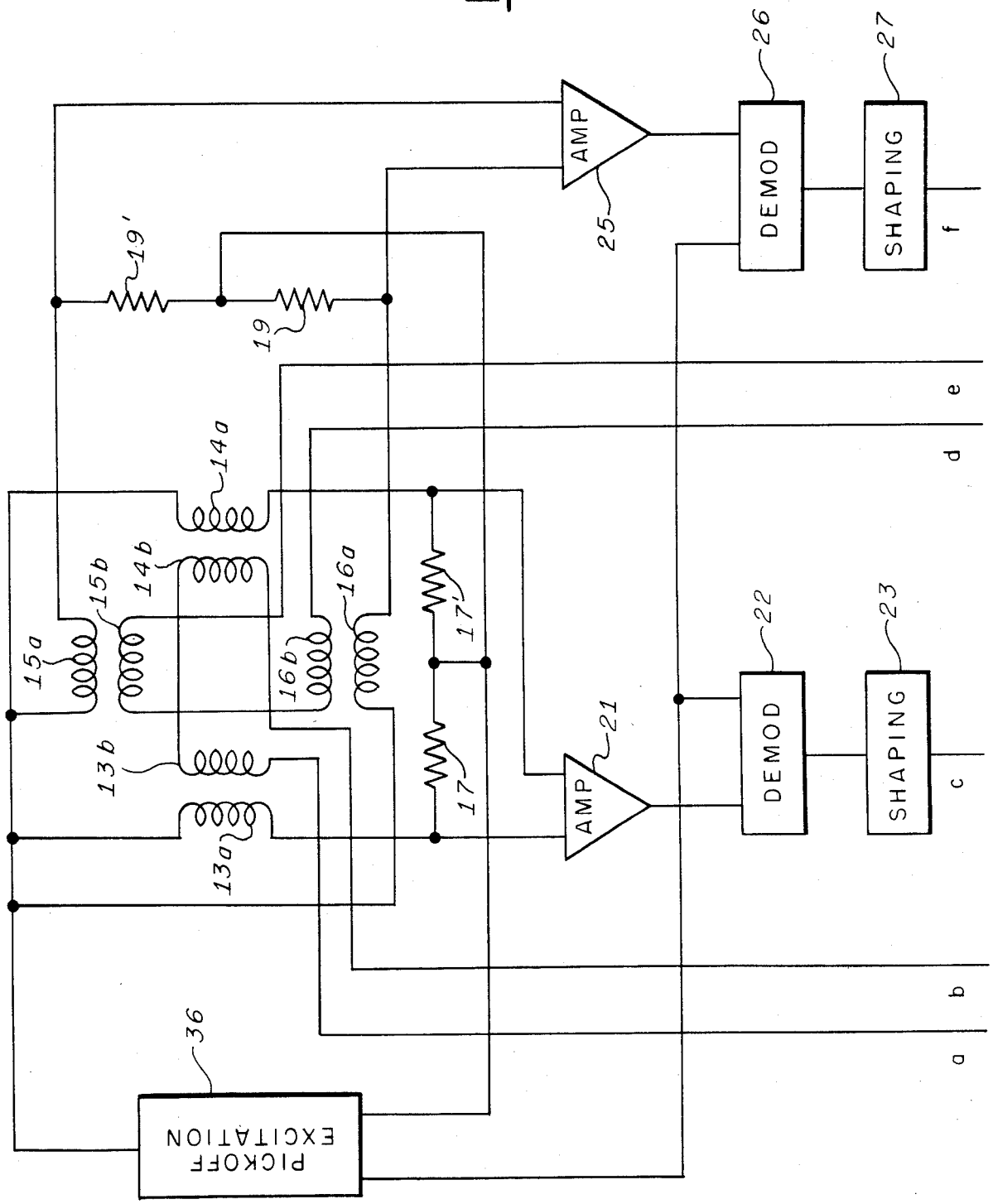
FIGS. 2a and 2b is a block diagram of the electronic components associated with the present invention.
Figure 2B:
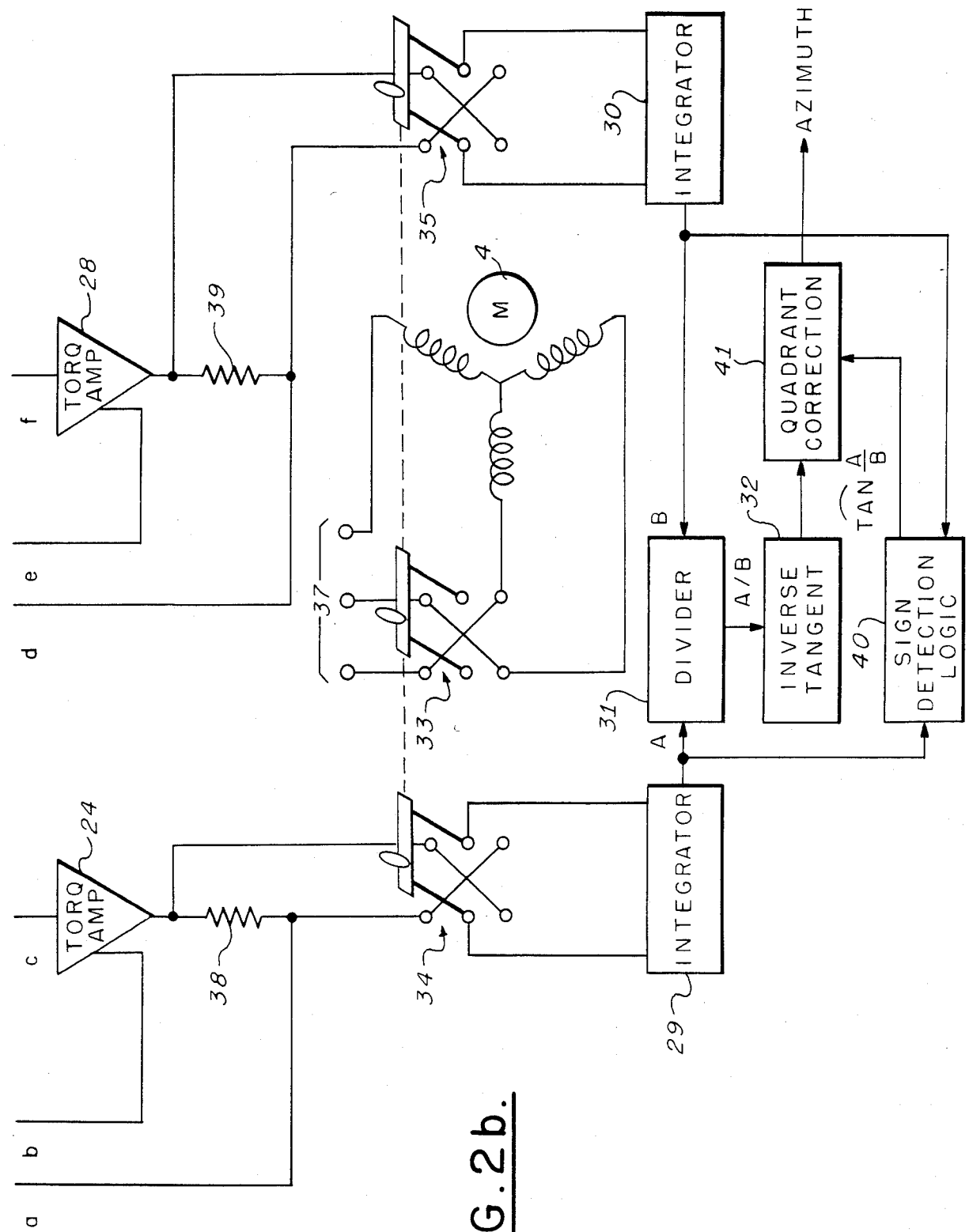

As shown in FIG. 2, the spin motor 4 is excited by a three phase alternating current supply 37, and the pickoffs are excited by a single phase supply 36 at a convenient frequency such as 20 KHz. Coils 13A and 14A together with resistors 17 and 17' form a conventional bridge circuit with its output connected to amplifier 21. The output signal is converted to d.c. by demodulator 22. The d.c. is shaped by circuitry 23 and current amplified by 24 to drive torquer coils 13B and 14B connected in series opposition. Similarly coils 15A and 16A together with resistors 19 and 19' form a conventional bridge circuit with its output connected to amplifier 25. This signal is applied to torquer coils 15B, 16B coupled in series opposition via a demodulator 26, a shaping circuit 27, and an amplifier 28.

The torquer current in coils 13B, 14B passes through precision sampling resistor 38 and the current in coils 15B, 16B passes through matching precision sampling resistor 39. The voltages across these two sampling resistors 38 and 39 are integrated by integrators 29 and 30 respectively for a predetermined time. The quotient of the integrator outputs is obtained by divider 31 and the arc tangent of the quotient computed by element 32. The integrated outputs are also applied to logic detector 40 which determines the azimuth quadrant and supplies the required information to a quadrant correction circuit 41 which adds the required angle for 2nd, 3rd and 4th quadrant positions.

Reversing switches 33, 34, 35 are provided so that the wheel 2 rotation direction can be reversed and errors due to fixed biases eliminated. Switch 33 reverses the direction of rotation of the wheel 2. Switches 34, 35 reverse the sign of the signals to the integrators 29, 30. If the integrators 29, 30 are exposed to the torquing current signals for a predetermined time with the wheel 2 running clockwise and the same length of time with the wheel 2 running counterclockwise and the signal sign reversed, the total integrated signal will be a measure of only the differences in the average torques applied when the wheel was running counterclockwise from the average torques applied when the wheel was running clockwise. By this means fixed torques (those which do not change when the wheel is reversed) are eliminated and an accurate measure of azimuth is obtained.

A significant practical consideration in the design of the apparatus of the present invention is the provision of restraint of the gimbal 1 about the spin axis. The thin suspension wire 5 provides so little restraint that the natural period of oscillation of the gimbal 1 and suspension wire 5 as a torsion pendulum is approximately 10 to 20 seconds. Obviously with such low restraint and the typical torque disturbances of ball bearings, the gimbal 1 would be bouncing off of the stops continually if some form of azimuth restraint were not provided. This restraint, however, may be provided by configuring the power leads of the spin motor 4 so that they restrain the gimbal 2 in azimuth without imposing significant restraint about either horizontal axis.

Figure 4:
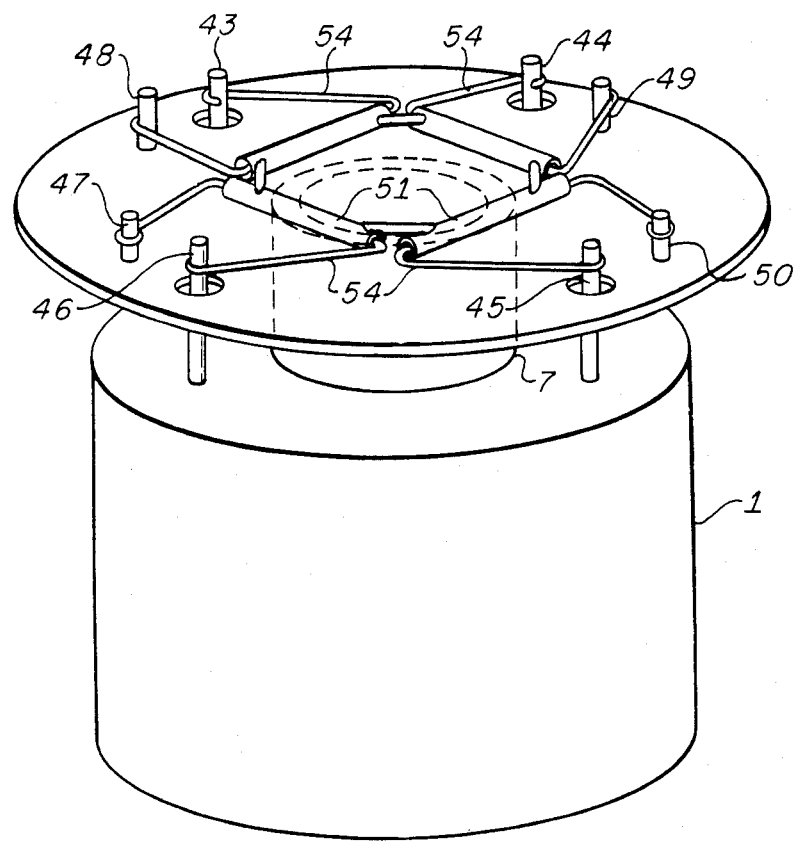
FIGS. 4, 4a, 4b, 4c, 5 and 5a are illustrations of the gimbal restraint means associated with the present invention.
Figure 4A:
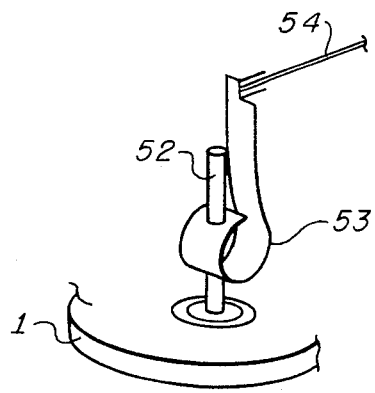
Figure 4B:
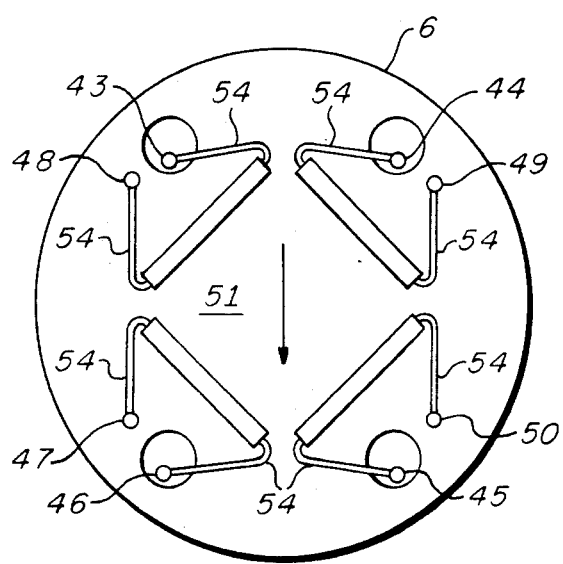
Figure 4C:
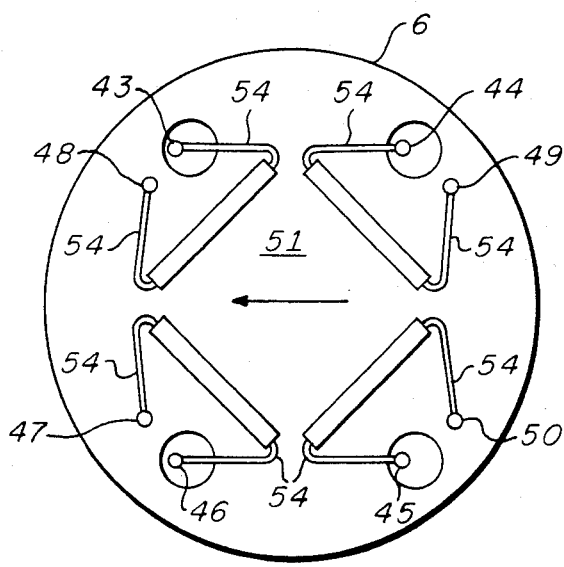

A first configuration to achieve this restraint is illustrated in FIG. 4 and FIG. 4a. FIG. 4 is an illustration of the apparatus of FIG. 1 with the cover of fixed case 6 removed and the upper tubular portion 7 of gimbal 1 cut away for purposes of clarity. Terminals 43, 44, 45 and 46 are mounted to the gimbal 1 and terminals 47, 48, 49 and 50 are mounted to the case 6. Leads 54, preferably fabricated from thin metallic conductors (silver 0.0005"×0.005" for example) connect terminals 43 to 48, 44 to 49, 45 to 50, and 46 to 47. The four leads 54 are insulated from one another but are attached to a light rigid square frame 51. Lateral displacements of the gimbal cause deflections of the leads from their collinear rest positions as shown in FIG. 4b and FIG. 4c where the direction of displacement of the gimbal is indicated by the arrow. As long as the displacements are small, the restraint on lateral movement per unit displacement is very small. However, the restraint of rotation of the gimbal 1 about a vertical axis is very high since it is resisted by direct tensil forces in the flex leads 54. The flex leads 54 are installed essentially without tension. In order to prevent breakage during rough handling, each end of the flex leads 54 is attached to a preloaded spring on the terminal. This arrangement is shown in FIG. 4a in which terminal 46 is attached to gimbal 1 having flex lead 54 attached thereto via a preloaded leaf spring 53. The leaf spring 53 provides protection action when excessive tension, for example 1 gram, is applied to the flex lead 54.

Figure 5:
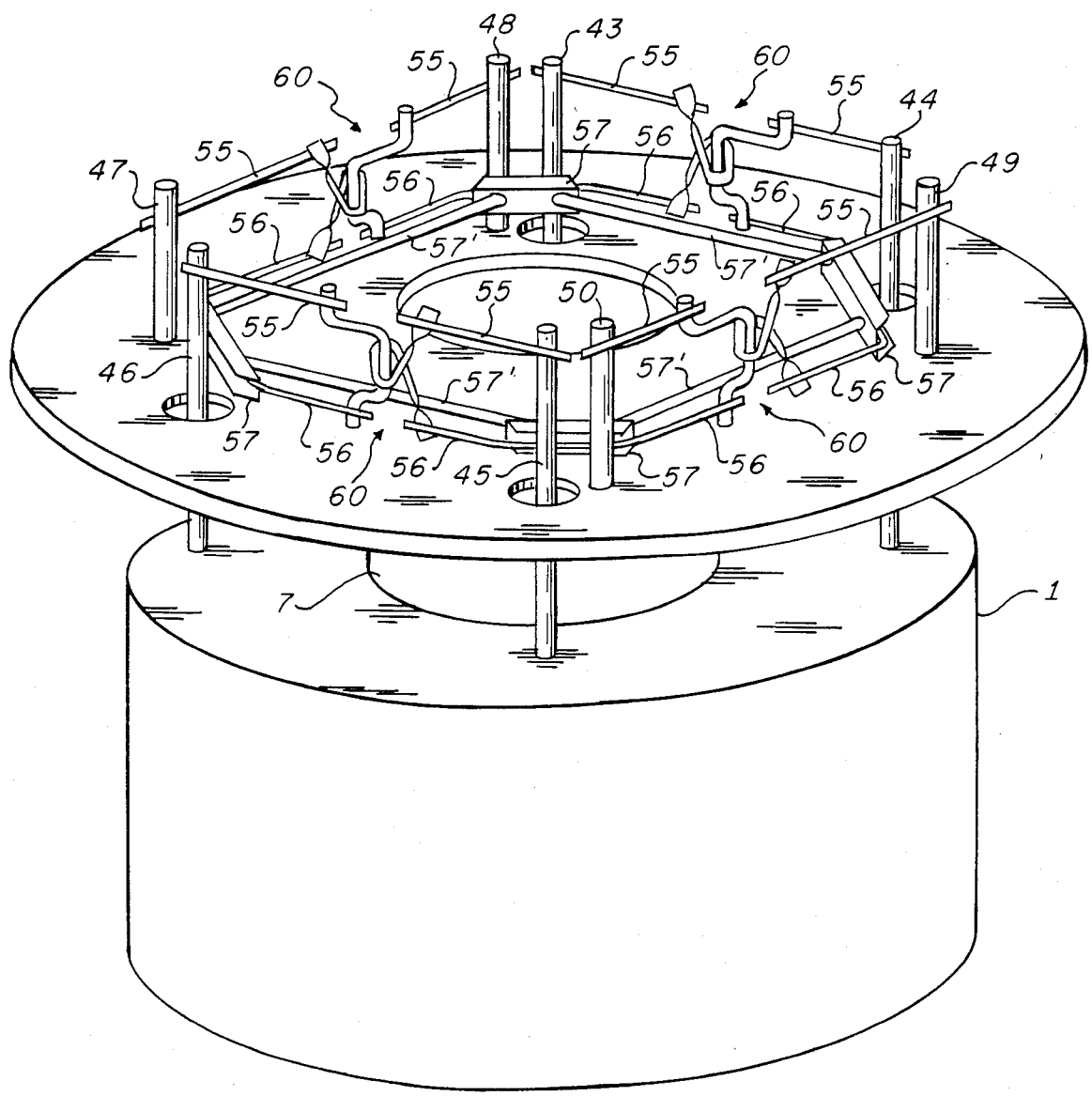
Figure 5A:
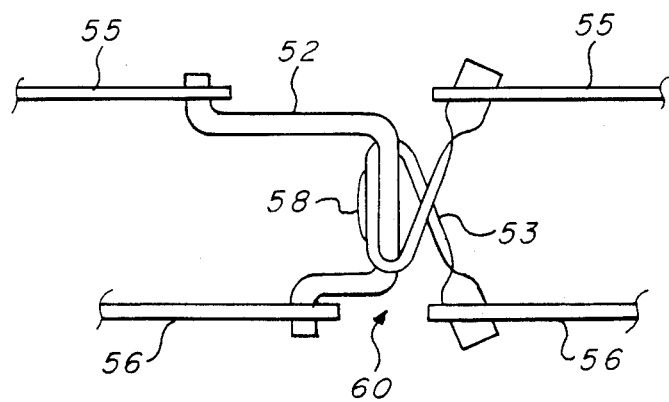

A second configuration or alternate embodiment for providing restraint which provides low lateral restraint over a greater range of movement is illustrated in FIG. 5. This arrangement has lower restraint about azimuth than that shown in FIG. 4, but more than enough to keep the gimbal 1 positioned away from its stops. As in FIG. 4, terminals 43, 44, 45 and 46 are mounted to the gimbal 1 and terminals 47, 48, 49 and 50 are mounted to the frame or case 6. The flex leads 55, 56 are arranged in two planes and consist of tensioned strands of thin conductor such as silver 0.0005"×0.005". Tensioning spreaders 60 shown in detail in FIG. 5a consist of insulated magnet wire shape 52 and beryllium copper spring loop 53 fastened together with an epoxy adhesive 58. Electrical circuits are completed from terminals 43, 44, 45, and 46 on gimbal 1 to adjacent terminals 48, 49, 50, and 47 respectively on frame 6 by means of upper flexible conductors 55 and lower flexible conductors 56 interconnected as shown by tensioning spreaders 60 and channel segments 57' of a rigid octagonal ring made of eight segments 57, 57' cemented together and electrically insulated from one another. The short overhanging channel segments 57 are made of brass to facilitate terminating the flex leads by soldering. The remaining segments 57' are made of thin walled tubing. Lateral displacement of the gimbal 1 is accommodated by twisting deflection of the flex leads 55, 56. Azimuth restraint is insured by tensioning the leads and interrupting the upper set of leads 55 with a rigid spacer connected to the lower set of leads 56.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gyroscope comprising:
   a case;
   mechanically balanced gimbal means having lower and upper surfaces;
   means for suspending said gimbal means from said case;
   a spin motor, coupled to said lower surface of said gimbal means, having a wheel coupled thereto for spinning about a vertical axis, and
   means, coupled to said upper surface of said gimbal means, for measuring positions of said gimbal means with respect to said case and for providing torque to said gimbal means to precess said wheel, said measuring and torqueing means including:
   a plurality of pickoff and torquer coil pairs disposed along orthogonal axes of said measuring and torqueing means; and
   a plurality of plates, having magnets disposed therebetween coupled to said upper surface of said gimbal in a cooperating relationship with said pickoff and torquer coil pairs.

2. A gyroscope according to claim 1 further including means for restraining said gimbal.

3. A gyroscope according to claim 2 wherein said restraint means includes:
   a plurality of terminals attached to said case and said gimbal means;
   a plurality of flexible conductors coupling said terminals on said case to said terminals on said gimbal means; and
   a rigid frame coupled to said conductors.

4. A gyroscope according to claim 3 wherein said restraint means further includes means for applying tension to said conductors.

5. A gyroscope according to claim 3 or 4 wherein each torquer coil is responsive to output signals from said pickoff coil paired therewith.

6. The gyroscope according to claim 5 further including means for reversing rotation direction of said spin motor.

7. A gyroscope according to claim 6 further including means for integrating output signals of said torquer coils and said pickoff coils.

8. A gyroscope according to claim 7 further including means for dividing said integrated output signals of said integrating means to obtain a ratio representative signal of integrated output signals.

9. A gyroscope according to claim 8 further including means responsive to said ratio representative signal for providing an angle representative signal.

* * * * *